(12) United States Patent
Pic

(10) Patent No.: US 8,272,802 B2
(45) Date of Patent: Sep. 25, 2012

(54) SLOTTED JOINT FOR A DRIVE LINK

(75) Inventor: Pierre Pic, Etrepagny (FR)

(73) Assignee: Hutchinson, Paris (FR)

( * ) Notice: Subject to any disclaimer, the term of this patent is extended or adjusted under 35 U.S.C. 154(b) by 480 days.

(21) Appl. No.: 12/336,436

(22) Filed: Dec. 16, 2008

(65) Prior Publication Data

US 2009/0151597 A1 Jun. 18, 2009

(30) Foreign Application Priority Data

Dec. 17, 2007 (FR) .................................... 07 08806

(51) Int. Cl.
*B60G 7/00* (2006.01)

(52) U.S. Cl. ................... 403/226; 267/141.2; 267/140.5

(58) Field of Classification Search ................ 81/176.1, 81/177.1, 177.2, 177.85; 403/67, 78, 132, 403/133, 135, 150, 151, 203, 220–226; 267/293, 267/141.2, 140.5, 140.11, 140.12; 384/215, 384/220, 221, 222
See application file for complete search history.

(56) References Cited

U.S. PATENT DOCUMENTS

| | | | | | |
|---|---|---|---|---|---|
| 4,007,924 | A | * | 2/1977 | Jorn et al. ....................... 267/282 |
| 4,129,394 | A | * | 12/1978 | Eichinger et al. ................ 403/57 |
| 4,702,346 | A | * | 10/1987 | Uno et al. ....................... 181/207 |
| 4,872,651 | A | * | 10/1989 | Thorn ....................... 267/140.12 |
| 5,123,634 | A | * | 6/1992 | Schwerdt ................. 267/140.12 |
| 5,374,038 | A | * | 12/1994 | Hein ........................... 267/140.5 |
| 5,711,513 | A | * | 1/1998 | Bretaudeau et al. ..... 267/140.12 |
| 5,846,014 | A | * | 12/1998 | Arthur et al. ....................... 403/2 |
| 5,947,454 | A | * | 9/1999 | Miyamoto ............... 267/140.12 |
| 5,975,509 | A | * | 11/1999 | Miyamoto ............... 267/140.12 |
| 6,168,144 | B1 | * | 1/2001 | Bruehl ..................... 267/140.11 |
| 6,430,774 | B1 | * | 8/2002 | McLaughlin et al. ........... 16/2.1 |
| 6,457,380 | B1 | * | 10/2002 | Aazizou et al. ............. 74/579 E |
| 6,517,062 | B2 | * | 2/2003 | Kuwayama et al. ..... 267/140.12 |
| 6,698,731 | B2 | * | 3/2004 | Thornhill ................. 267/140.12 |
| 6,910,670 | B2 | * | 6/2005 | Kato ............................. 248/608 |
| 6,921,066 | B2 | * | 7/2005 | Hamada ................... 267/140.12 |
| 7,100,909 | B2 | * | 9/2006 | Ito ............................. 267/140.12 |
| 7,165,909 | B2 | * | 1/2007 | Buhl et al. ..................... 403/132 |
| 7,219,882 | B2 | * | 5/2007 | Kato ......................... 267/140.12 |
| 7,296,786 | B2 | * | 11/2007 | Hees ............................. 267/293 |
| 7,370,852 | B2 | * | 5/2008 | Nicholson et al. ....... 267/140.12 |

(Continued)

FOREIGN PATENT DOCUMENTS

DE 19913777 1/2001

(Continued)

*Primary Examiner* — Daniel P. Stodola
*Assistant Examiner* — Daniel Wiley
(74) *Attorney, Agent, or Firm* — Dorsey & Whitney LLP

(57) ABSTRACT

The present invention relates to a slotted joint comprising a central pin and an outer tube. In one embodiment, the slotted joint comprises a first and second elastomer arm, which are bonded to an outer surface of the central pin diametrically opposite each other and spaced apart from each other to form a first and second space. The slotted joint further comprises a first abutment positioned in the first space and a second abutment positioned in the second space. The first and second abutments include an abutment part made of a rigid material and a cylindrical sector made of an elastomer. The cylindrical sector may be bonded to an outer surface the central pin and to an inner surface of the abutment part. An outside face of the cylindrical sector is spaced apart from the inner surface of the outer tube when the joint is at rest.

10 Claims, 2 Drawing Sheets

U.S. PATENT DOCUMENTS

| | | | |
|---|---|---|---|
| 7,866,639 B2 * | 1/2011 | Endo | 267/140.12 |
| 2002/0020950 A1 * | 2/2002 | Bouhier et al. | 267/140.13 |
| 2004/0046298 A1 * | 3/2004 | Takeshita et al. | 267/293 |
| 2005/0211013 A1 * | 9/2005 | Aazizou et al. | 74/588 |
| 2006/0076721 A1 * | 4/2006 | Bouhier et al. | 267/141.2 |

FOREIGN PATENT DOCUMENTS

| | | |
|---|---|---|
| EP | 1586789 | 10/2005 |
| FR | 2695972 A1 * | 3/1994 |
| JP | 2000088026 | 3/2000 |
| JP | 2003072543 | 3/2003 |

* cited by examiner

SECTION AA

SECTION AB

SLOTTED JOINT FOR A DRIVE LINK

CROSS-REFERENCE TO RELATED APPLICATION

This application claims priority to FR Patent Application No. 07/08806, filed Dec. 17, 2007.

The entire disclosure of the prior application is considered to be part of the disclosure of the instant application and is hereby incorporated by reference herein.

TECHNICAL FIELD

This invention relates to a slotted joint, and more particularly one or more embodiments relate to a slotted joint for a drive link forming part of a body-bogey drive device for a train.

BACKGROUND OF THE INVENTION

A bogey (or bogie) is a structure under a train to which axles are attached. One purpose of the bogey is to ensure ride comfort by absorbing vibration. Another purpose is to minimize centrifugal forces when the train runs along curved tracks. It is preferred that the bogey achieves the above purposes while filtering noise.

A joint used in a drive link forming part of a body-bogey drive device for a train may be used to absorb vibration and minimize centrifugal forces. The joint preferably provides a high degree of flexibility in a first direction, such as the train travel direction, to absorb vibration, thus providing comfort and filtering noise. However, the joint preferably also provides a high degree of stiffness in the first direction when radial loading becomes large. Additionally, the joint preferably provides a high degree of stiffness in a second direction, such as the vertical direction, in which the second direction is perpendicular to the first.

There is, therefore, a need for an improved joint that is operable to provide the preferred stiffness' described above.

SUMMARY OF THE INVENTION

The present invention relates to a slotted joint comprising a central pin and an outer tube. In one embodiment, the slotted joint comprises a first and second elastomer arm. The first and second elastomer arms may be bonded to an outer surface of the central pin diametrically opposite each other and spaced apart from each other to form a first and second space. The slotted joint further comprises a first and second abutment. The first abutment is positioned in the first space, and the second abutment positioned in the second space. The first and second abutments include an abutment part made of a rigid material and a cylindrical sector made of an elastomer. The cylindrical sector may be bonded to an outer surface the central pin and to an inner surface of the abutment part. An outside face of the cylindrical sector is spaced apart from the inner surface of the outer tube when the joint is at rest.

BRIEF DESCRIPTION OF THE DRAWINGS

FIG. 1b is a longitudinal cross sectional illustration of the slotted joint in FIG. 1a.

FIG. 2b is a side view of the drive link in FIG. 2a.

FIG. 2c shows section AB of the drive link in FIG. 2a.

DETAILED DESCRIPTION OF PREFERRED EMBODIMENTS

Embodiments of the present invention are directed toward a slotted joint. One or more of the embodiments are directed to a slotted joint for a drive link forming part of a body-bogey drive device for a train. Certain details are set forth below to provide a sufficient understanding of the embodiments of the invention. However, it will be clear to one skilled in the art that various embodiments of the invention may be practiced without these particular details.

Figure 1A:
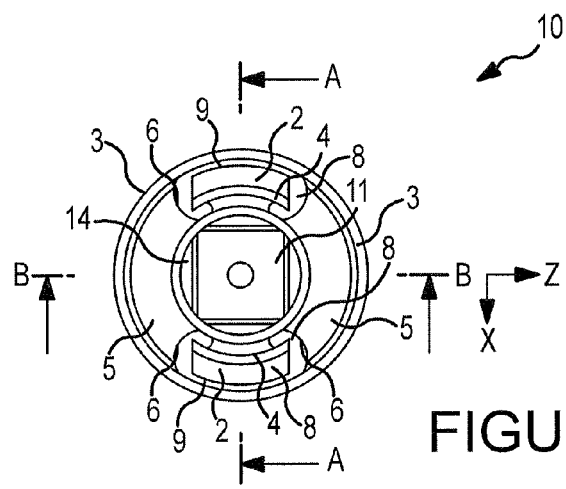
FIG. 1a is a cross sectional schematic illustration of a slotted joint according to one embodiment of the invention.
Figure 1B:
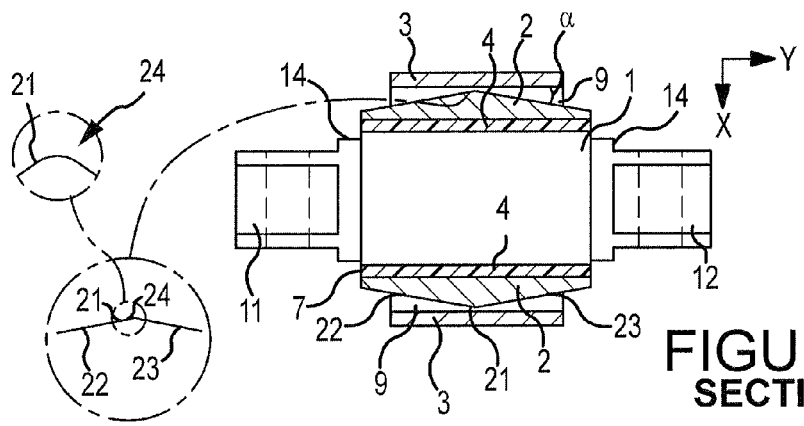
Figure 1C:
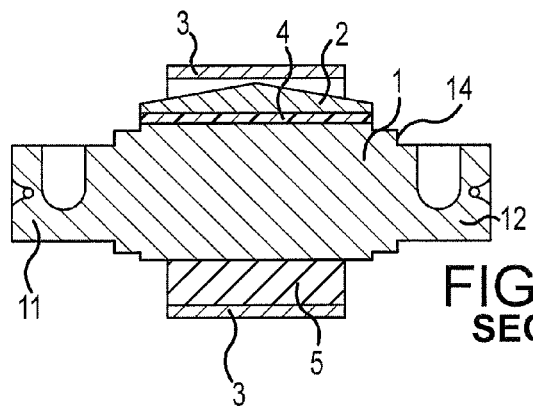
FIG. 1c shows section AB of the slotted joint in FIG. 1b

FIGS. 1a-1c illustrate a slotted joint 10 according to one embodiment of the invention. The slotted joint 10 includes a cylindrical part forming a central pin 1 that provides couplings 11 and 12 at its ends. In the embodiment shown in the FIGS. 1a-1c, the couplings 11 and 12 have square cross-sections. The couplings 11 and 12 connect with the pin 1 via respective shoulders 14. The couplings 11 and 12 serve to fasten the joints to a bogey or to a structural element of a rail vehicle. An outer cylindrical tube 3 is coaxial about the pin 1 in the Y direction. The outer cylindrical tube 3 is designed to be received in an end of a drive link.

The slotted joint 10 includes two arms 5 having an inner surface bonded to an outer surface of the pin 1 and an outer surface bonded to an inner surface of the tube 3. The two arms 5 are made from a flexible material. In one embodiment, the arms 5 are made from an elastomer material On either side of their plane of symmetry (parallel to the Z direction, which in the intended application is vertical), each of the two arms 5 terminate at ends 6 to define two spaces 8, respectively. In one embodiment the ends 6 of the arms 5 that define the spaces 8 are concave. Each of the two spaces 8 are adapted to house an abutment.

The abutment includes a cylindrical sector 4 and an abutment part 2. The cylindrical sector 4 is made from a flexible material. In one embodiment the cylindrical sector is made from an elastomer material. An inner surface of the cylindrical sector 4 is bonded to an outer surface of the pin 1. An outer diameter of the cylindrical sector 4 is bonded to an inner surface the abutment part 2. In one embodiment, ends 6 of the cylindrical sectors 4 are concave. In particular, the cylindrical sectors may form a concave meniscus, such as a semi-circular meniscus. This may limit swelling of the elastomer and to increase its lifetime. The abutment part is made from a rigid material. In one embodiment, the abutment part 2 is made from a metal material. In one embodiment, the pin 1 projects longitudinally from each end of the outer tube 3. Additionally, the cylindrical sectors 4 and the abutment parts 2 may also project longitudinally from each end of the outer tube 3. Each abutment part 2 is housed in the respective spaces 8 between concave ends 6 of the two arms 5.

When the slotted joint is in the rest position as is shown in FIGS. 1a-1c, the outer surface of the abutment part 2 is spaced apart from the inner surface of the tube 3 to define region 9. As shown in detail in a close up illustration in FIG. 1b, the abutment part 2, includes a convex top region 21 that provides a top 24. The top region 21 of the abutment part 2 is bordered by two straight line segments 22 and 23. Each of the straight line segments form an angle α relative to the inner surface of the tube 3 (the Y direction). The region 9 is defined by the clearance between the top 24 of the rounded top region 21 of the abutment part 2, the straight line segments 22 and 23, and the inside surface of the tube 3.

The transverse direction X is the train travel direction, the longitudinal direction Y of the joint is the transverse direction relative to the train, and the Z direction is vertical. As discussed above, a preferred function of a joint in a drive link is to provide high radial stiffness in the vertical direction Z (or second direction as referred to above), and to provide low stiffness in the direction X (or first direction as referred to above) in order to provide comfort and filter noise, followed by a high level of stiffness under strong radial stress.

In the slotted joint 10, the high stiffness in the Z direction and the low stiffness (or high degree of flexibility) in the X direction is provided by the arms 5. More particularly, at low levels of stress on the joint in the travel direction X of the rail vehicle, elasticity is thus provided by the arms 5. The cylindrical sectors 4 provide the high stiffness function that is required in the X direction for high levels of radial stress. For instance, under higher loads in the X direction, the clearance between the top 24 of the rounded top region 21 of the abutment part 2 and the inner surface tube 3 disappears and stiffness is then defined by the cylindrical sectors 4. Therefore, the cylindrical sectors 4 provide the high stiffness when the abutment part 2 comes into contact with the inner surface of the tube 3.

The contact point between the abutment part 2 and the inner surface of the tube 3 is metal on metal to avoid rapid wear by abrasion. In practice this does not present drawbacks since the noise of making contact is dampened by the cylindrical sectors 4, which is made of an elastomer material.

In order to satisfy an additional constraint, namely the presence of a high degree of conical movement, the abutment part 2 has a convex profile, in the longitudinal cross section shown in FIG. 1b. The convex profile is directed towards the outer tube 3. This avoids localized pinching of the elastomer at a longitudinal end, as would otherwise happen with an abutment part of cylindrical shape.

The outer surface of the abutment part 2 is shaped so as to provide a profile (in the longitudinal cross section) that is convex at the rounded top region 21. As will be explained the convex profile avoids localized pinching of the cylindrical sectors 4 at each end. If the abutment part 2 were cylindrical in shape, localized pinching of the cylindrical sectors would typically happen. The convex profile includes the rounded top region 21, which includes a top 24 that is situated roughly at the center of the tube 3 in the Y direction. As discussed above the region 21 is bordered by two straight line segments 22 and 23. Each straight line segments 22 and 23 are inclined at an angle α relative to the axis of the outer tube 3. In one embodiment, the angle α is approximately in the range 5° to 12°. In another embodiment, the α is roughly equal to 10°.

The angle α formed by the two straight line segments 22 and 23 relative to the Y direction determines the maximum value of the cone angle. Under the action of conical deformation, the longitudinal pin 1 of the slotted joint 10 is no longer parallel to the Y direction, however, the point of contact between the abutment part 2 and the inner surface of the tube 3 remains localized in the top region 21.

In the event of conical movement, the presence of a rounded top region 21 ensures that the point of contact between the abutment part 2 and the outer tube 3 remains situated in the vicinity of the top 24, thereby avoiding any concentration of stress in the rubber layer of the cylindrical sectors 4. Thus, even under heavy loads with a large cone angle under radial stress in the X direction, the abutment part 2 bears on the cylindrical sector 4 in the vicinity of its middle, thereby avoiding any concentration of stresses at the ends 7 of the cylindrical sectors 4 and avoids fatiguing the elastomer that constitutes them. When a maximum angle is reached, one of the straight line segments 22 or 23 bears flat against the tube 3, thereby also avoiding any concentration of stress at the ends 6 of the cylindrical sectors 4.

In order to provide better fatigue behavior, the elastomer surface area of the abutment may be increased. Therefore as discussed above, in one embodiment the elastomer surface area of the abutment is increased by making the cylindrical sectors 4, the abutment part 2, and the pin 1 project longitudinally from each end of the tube 3.

Figure 2A:
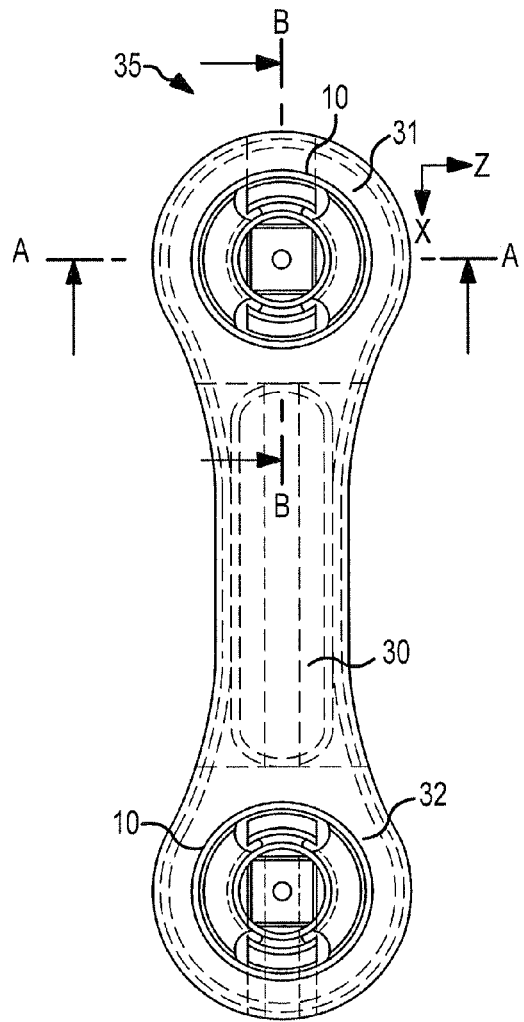
FIG. 2a is a plan view of a drive link for a body-bogey drive device fitted with two slotted joints according to one embodiment of the invention.
Figure 2B:
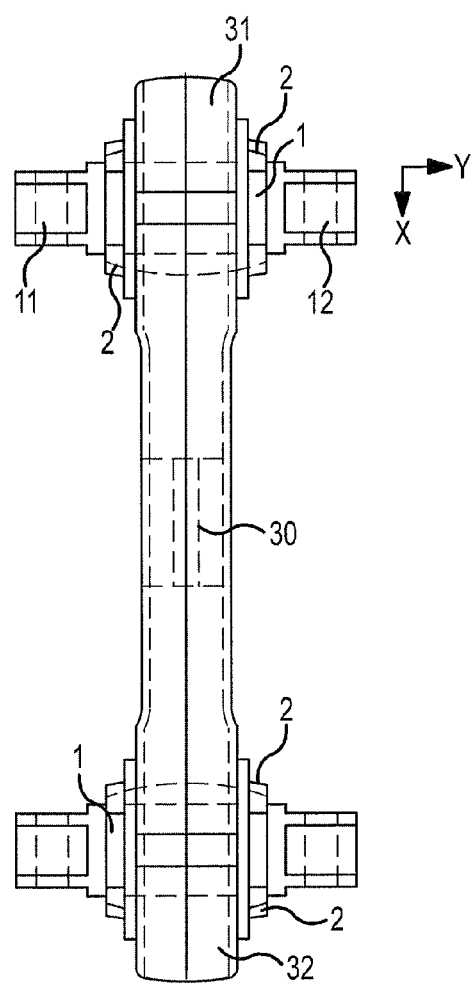
Figure 2C:
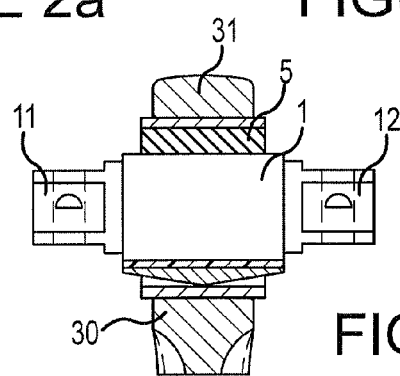

FIG. 2a is a plan view of a drive link 35 for a body-bogey drive device fitted with two slotted joints 10 according to one embodiment of the invention. FIG. 2b is a side view of the drive link 35 in FIG. 2a. FIG. 2c shows section AB of the drive link 35 in FIG. 2a. A first slotted joint 10 is positioned in a first end 31 of the drive link 35. A second slotted joint 10 is positioned in a second end 32 of the drive link 35. In practice, one end of the drive link 35 may be coupled to a body and the other end may be coupled to a bogey.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. A slotted joint comprising a central pin and an outer tube, the central in having a length and a longitudinal axis extending along said length and through a center of the central pin, the joint comprising:
   a first and second elastomer arm, the first and second elastomer arms being bonded to an outer surface of the central pin and to an inner surface of the outer tube diametrically opposite each other and spaced apart from each other to form opposing first and second spaces; and
   a first and second abutment, the first abutment positioned in the first space and the second abutment positioned in the second space, the first and second abutments each including an abutment part made of a rigid material and a cylindrical sector made of an elastomer, the cylindrical sector being bonded to an outer surface of the central pin and to an inner surface of the abutment part, an outside face of the abutment part being spaced apart from an inner surface of the outer tube when the joint is at rest, wherein a longitudinal cross section of each abutment part comprises a convex profile relative to the longitudinal axis, wherein the convex profile of the abutment part provides a top region situated at approximately a longitudinal center of the outer tube, and wherein the top region is bordered by two inclined straight line segments each extending along and making an angle (α) with an axis along the length of the tube.

2. The joint according to claim 1, wherein the convex profiles of the abutment parts include a rounded top region.

3. The joint according to claim 1, wherein the angle α lies in the range of approximately 5° to 12°.

4. The joint according to claim 1, wherein the angle α is approximately 10°.

5. The joint according to claim 1, wherein the central pin and the first and second abutments project longitudinally from each end of the outer tube.

6. The joint according to claim 1, wherein ends of the first and second cylindrical sectors of the abutments are concave.

7. The joint according to claim 6, wherein the ends of the first and second cylindrical sectors form concave meniscuses that are substantially semicircular in cross-section.

8. The joint according to claim 1, wherein edges of the first and second elastomer arms that define the first and second spaces are concave in cross-section.

9. The joint according to claim 1, wherein the central pin presents assembly elements at each of its two ends for assembly to a structural element of a rail vehicle.

10. The joint according to claim 1, wherein the first and second elastomer arms are formed in a first plane of symmetry and the first and second abutments are formed in a second plane of symmetry.

* * * * *